(12) United States Patent
Chuang

(10) Patent No.: US 10,329,083 B1
(45) Date of Patent: Jun. 25, 2019

(54) BICYCLE TRANSPORT CASE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 15/962,029

(22) Filed: Apr. 25, 2018

(51) Int. Cl.
*A45C 13/02* (2006.01)
*B65D 85/68* (2006.01)
*B62J 19/00* (2006.01)
*B62H 3/10* (2006.01)
*B62J 23/00* (2006.01)

(52) U.S. Cl.
CPC .............. *B65D 85/68* (2013.01); *B62H 3/10* (2013.01); *B62J 19/00* (2013.01); *B62J 23/00* (2013.01); *A45C 13/02* (2013.01); *B62H 2700/005* (2013.01); *B65D 2585/6862* (2013.01)

(58) Field of Classification Search
CPC .. B65D 85/68; B65D 2585/6862; B62J 99/00; B62J 19/00; A45C 2013/026; A45C 11/00; A45C 13/02; A45C 13/103; B62H 3/10; B62H 3/00
USPC ...... 206/335, 577, 232; 150/167; 211/17, 22
See application file for complete search history.

(56) References Cited

U.S. PATENT DOCUMENTS

| | | | | |
|---|---|---|---|---|
| 2,339,947 A | * | 1/1944 | Reaume | B65D 85/68 206/335 |
| 3,886,988 A | * | 6/1975 | Garrett | B62J 99/00 150/167 |
| 4,353,464 A | * | 10/1982 | Bentler | B65D 85/68 206/303 |
| 4,390,088 A | * | 6/1983 | Brenner | B62J 9/00 206/335 |
| 4,792,039 A | * | 12/1988 | Dayton | A45C 5/14 206/304 |
| 4,892,190 A | * | 1/1990 | Delgado | B62J 99/00 206/304 |
| 4,991,715 A | * | 2/1991 | Williams | A45C 5/14 206/335 |
| 5,097,922 A | | 3/1992 | Stagi | |
| 5,669,497 A | * | 9/1997 | Evans | B65D 85/68 206/335 |
| 8,196,740 B2 | | 6/2012 | Jacques et al. | |
| 9,446,896 B2 | * | 9/2016 | Pelegrin | B62B 3/04 |
| 9,821,948 B2 | * | 11/2017 | Noer | A45C 5/14 |
| 2004/0222617 A1 | | 11/2004 | Darling, III | |

(Continued)

FOREIGN PATENT DOCUMENTS

CN 202463720 U 10/2012
CN 204077932 U 1/2015

(Continued)

*Primary Examiner* — Steven A. Reynolds
(74) *Attorney, Agent, or Firm* — Alan D. Kamrath; Mayer & Williams PC

(57) ABSTRACT

A bicycle transport case includes a container adapted to be opened and closed. The container includes a first outer side and a second outer side and has a chamber for receiving a bicycle frame defined by interior sides of the first and second outer sides. A retaining device configured to retain the bicycle frame at various angular orientations is pivotally and detachably connected to the container. The retaining device includes a main guide rail pivotally connected to the container about an axis and at least one retaining stand for retaining the bicycle frame movably mounted on the main guide rail and adapted to be locked in various positions on the main guide rail.

17 Claims, 15 Drawing Sheets

(56) References Cited

U.S. PATENT DOCUMENTS

| | | | | |
|---|---|---|---|---|
| 2010/0230311 | A1* | 9/2010 | Jacques | A45C 11/00 206/335 |
| 2015/0266664 | A1* | 9/2015 | Noer | A45C 5/14 206/216 |
| 2018/0044103 | A1* | 2/2018 | Gustavsson | A45C 11/00 |

FOREIGN PATENT DOCUMENTS

| | | |
|---|---|---|
| CN | 205197308 U | 5/2016 |
| JP | 2002154379 A | 5/2002 |
| WO | WO2014086907 A1 | 6/2014 |
| WO | WO2015139169 A1 | 9/2015 |

* cited by examiner

BICYCLE TRANSPORT CASE

BACKGROUND OF THE INVENTION

1. Field of the Invention

The present invention relates to a transport case and, particularly, to a bicycle transport case.

2. Description of the Related Art

U.S. Pat. No. 8,196,740 shows a bicycle travel/storage bag for transporting or storing a partly disassembled bicycle. The bag defines a compartment and has a base, soft and collapsible left and right side panels, and a front panel. The base has an anchor for attaching a bicycle frame in an upstanding position. The left and right panels respectively have an insert for securing a bicycle wheel. The front panel and the left and right side panels can be opened. The front panel is opened independently from the left and right side panels.

When unpacking the bag, it is required that the bicycle frame is retained upright in order to take the bicycle wheels out of the bag without damaging the bicycle frame. Additionally, when the wheel on the right side panel is taken out of the bag, a user has to prevent the left side panel from falling open by gravity in order to avoid damage to the wheel on the left side panel.

The present invention is, therefore, intended to obviate or at least alleviate the problems encountered in the prior art.

SUMMARY OF THE INVENTION

According to the present invention, a bicycle transport case includes a container adapted to be opened and closed. The container includes a first outer side and a second outer side and has a chamber for receiving a bicycle frame defined by interior sides of the first and second outer sides. A retaining device configured to retain the bicycle frame at various angular orientations is pivotally and detachably connected to the container. The retaining device includes a main guide rail pivotally connected to the container about an axis and at least one retaining stand for retaining the bicycle frame movably mounted on the main guide rail and adapted to be locked in various positions on the main guide rail.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a bicycle transport case that a user can open and close without worrying about causing damage to a bicycle stored in the bicycle transport case.

Other objectives, advantages, and new features of the present invention will become apparent from the following detailed description of the invention when considered in conjunction with the accompanied drawings.

DETAILED DESCRIPTION OF THE INVENTION

Figure 1:
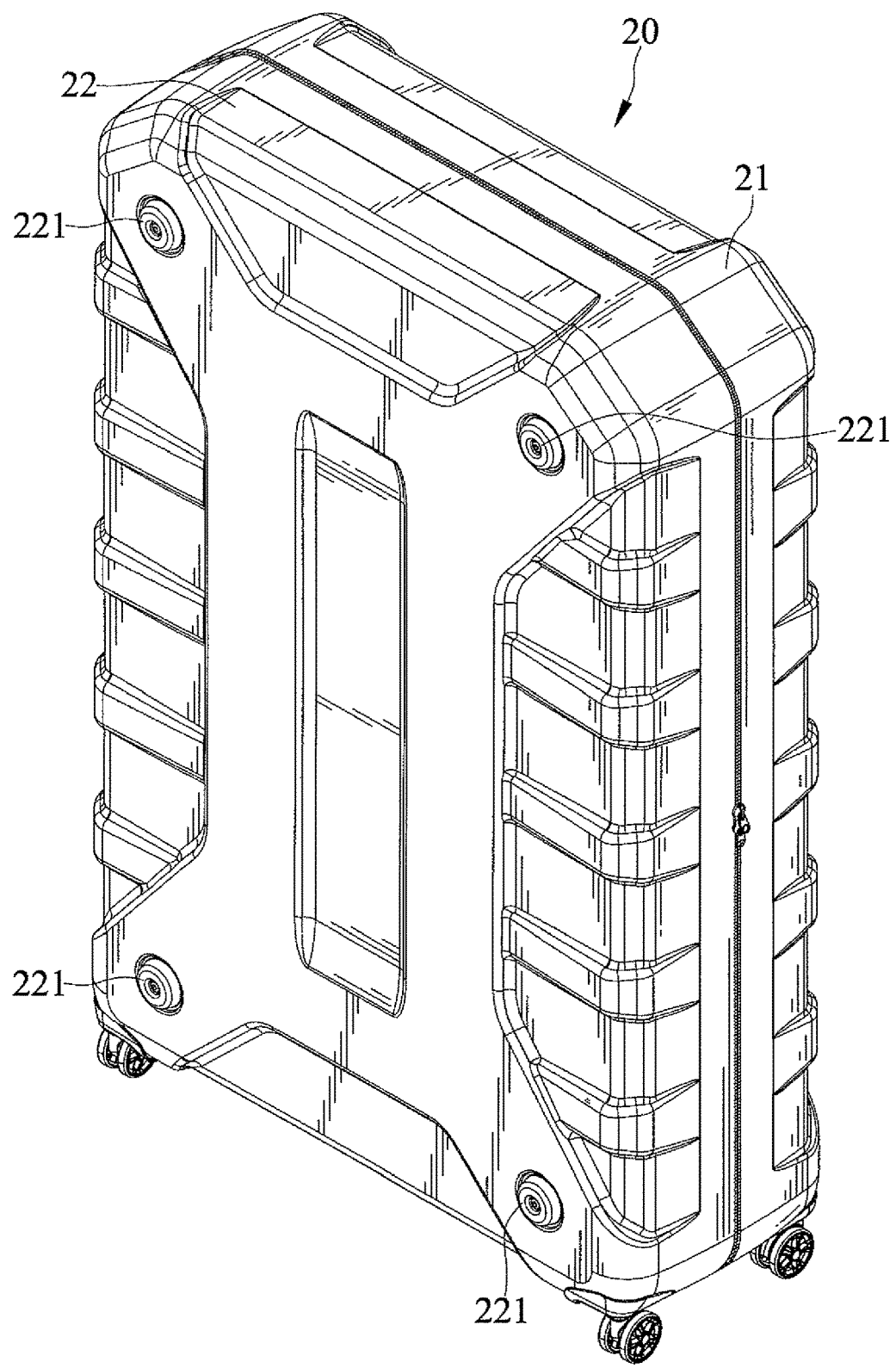
FIG. 1 is a perspective view of a bicycle transport case in accordance with the present invention in a closed position.
Figure 2:
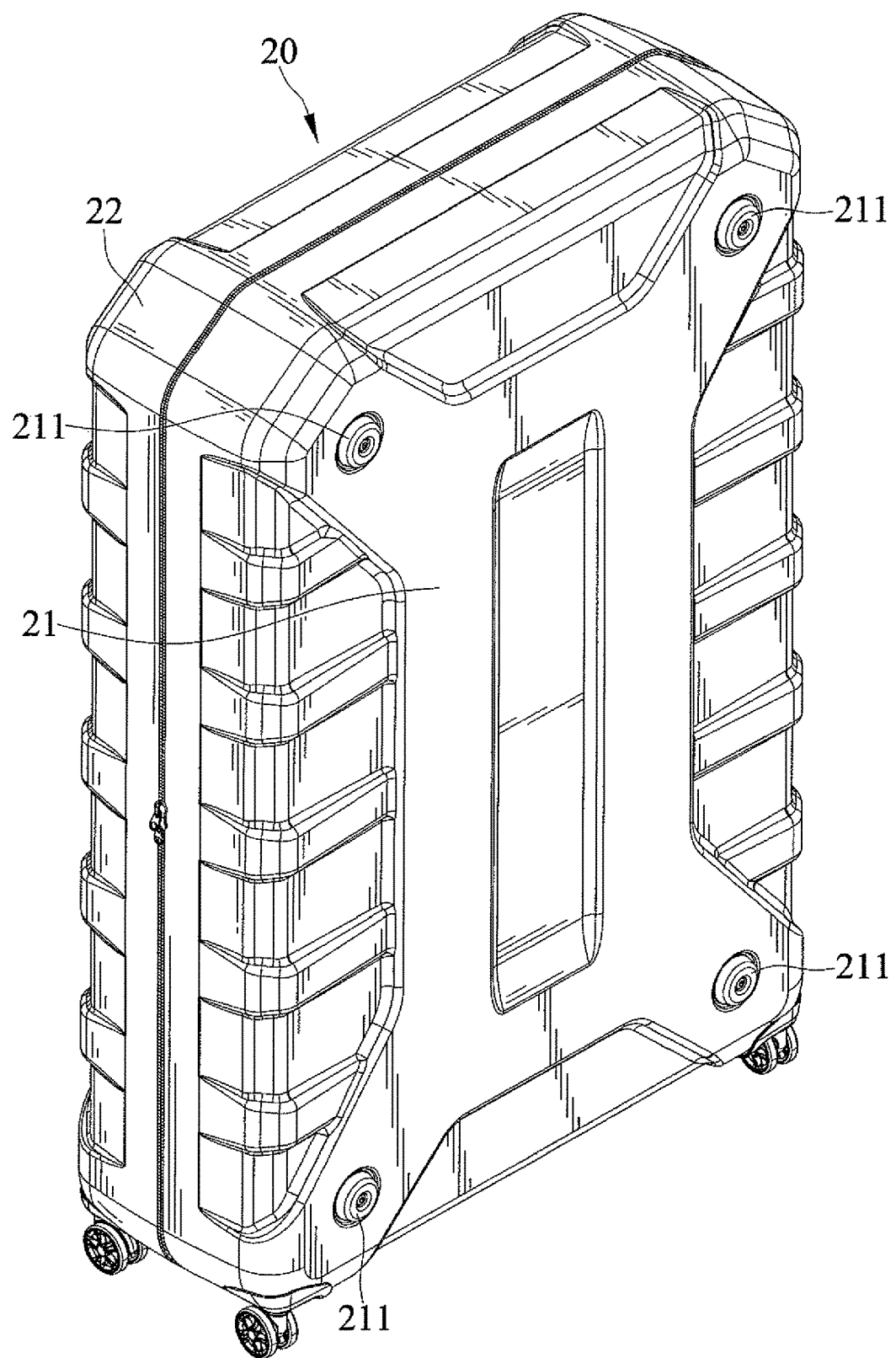
FIG. 2 is a view similar to FIG. 1, but taken from a different angle.
Figure 3:
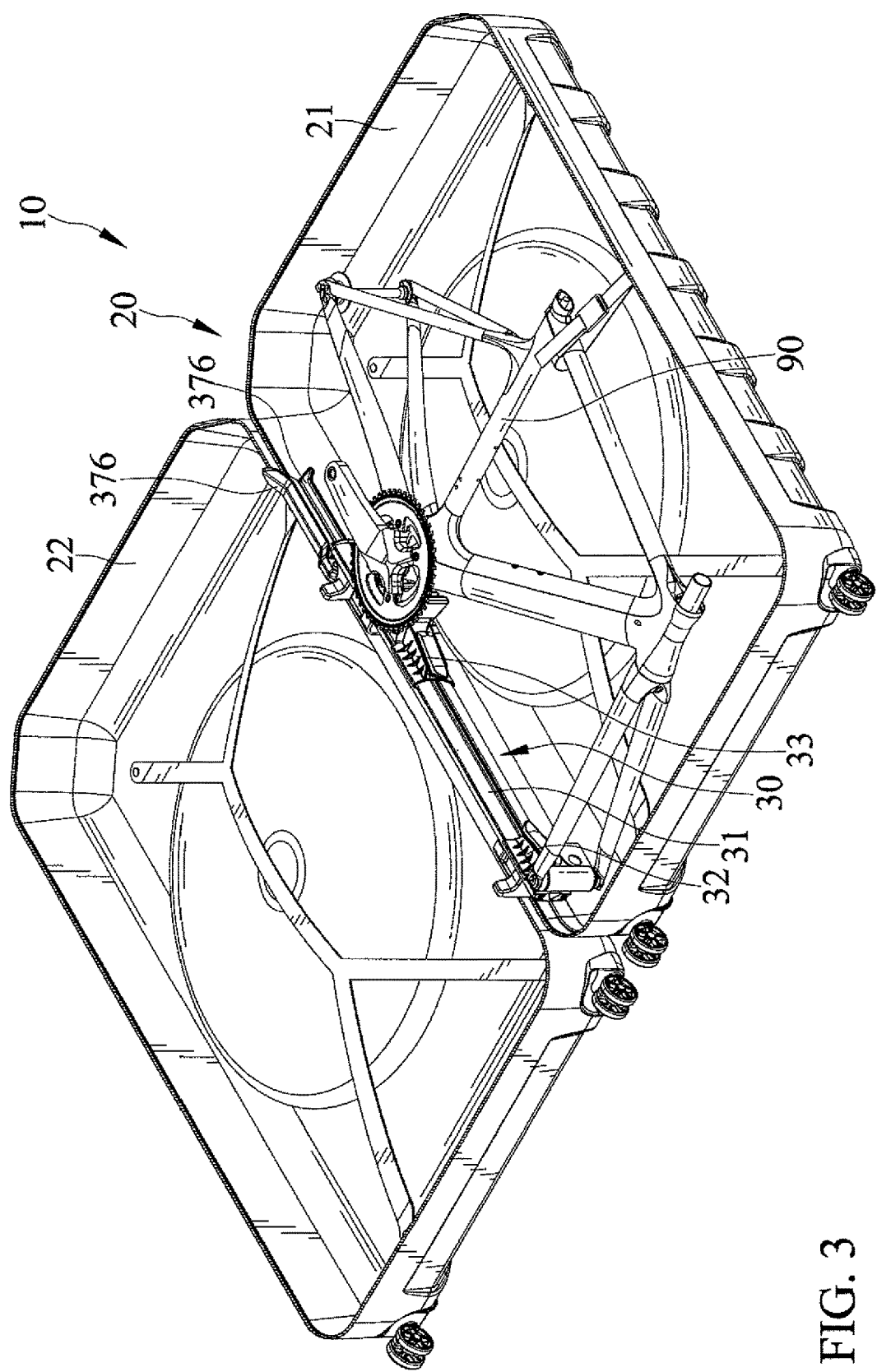
FIG. 3 is a perspective view showing the bicycle transport case in an open position and a retaining device retaining a bicycle frame in a first orientation.
Figure 4:
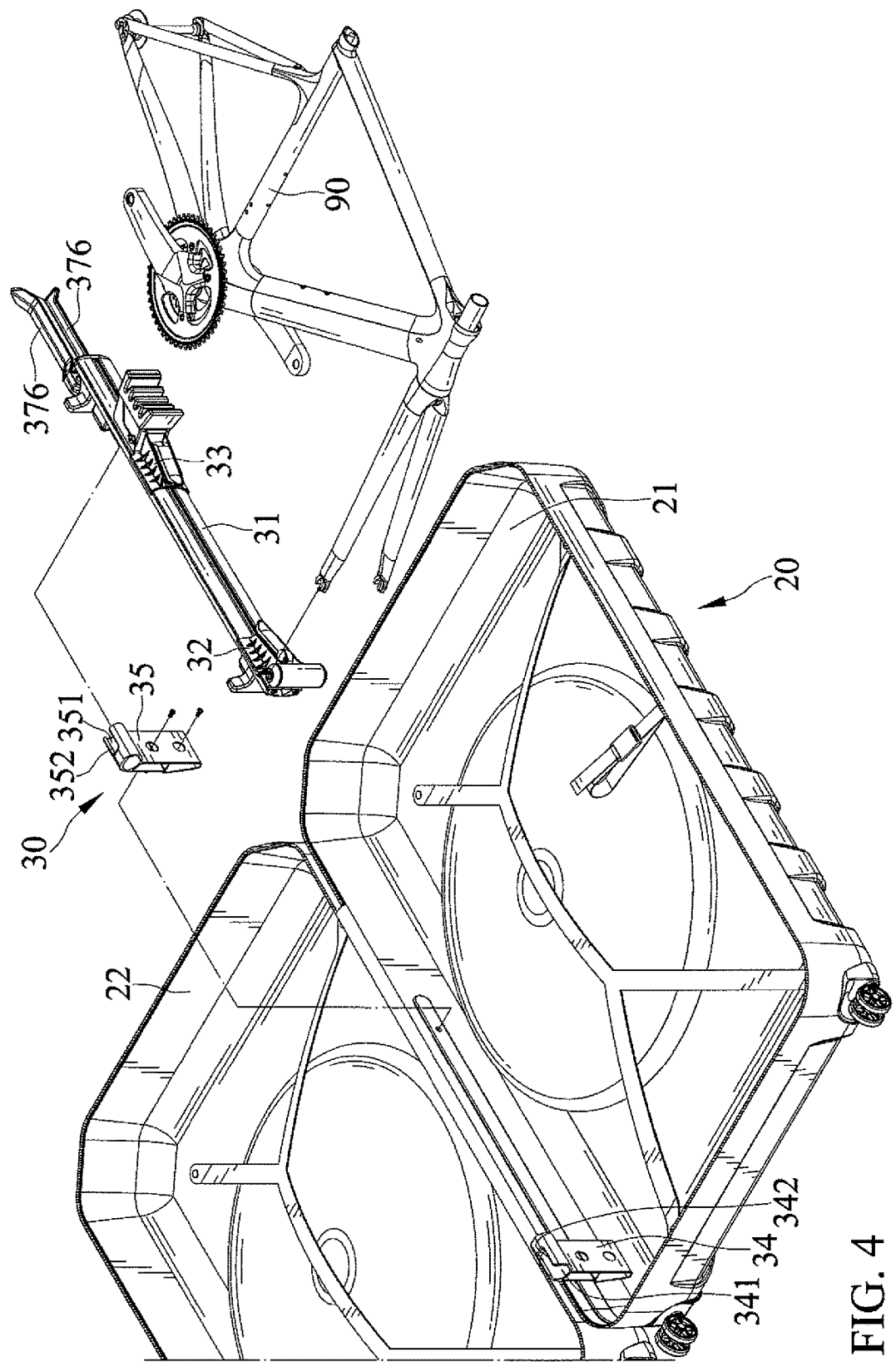
FIG. 4 is an exploded perspective view of FIG. 3.
Figure 5:
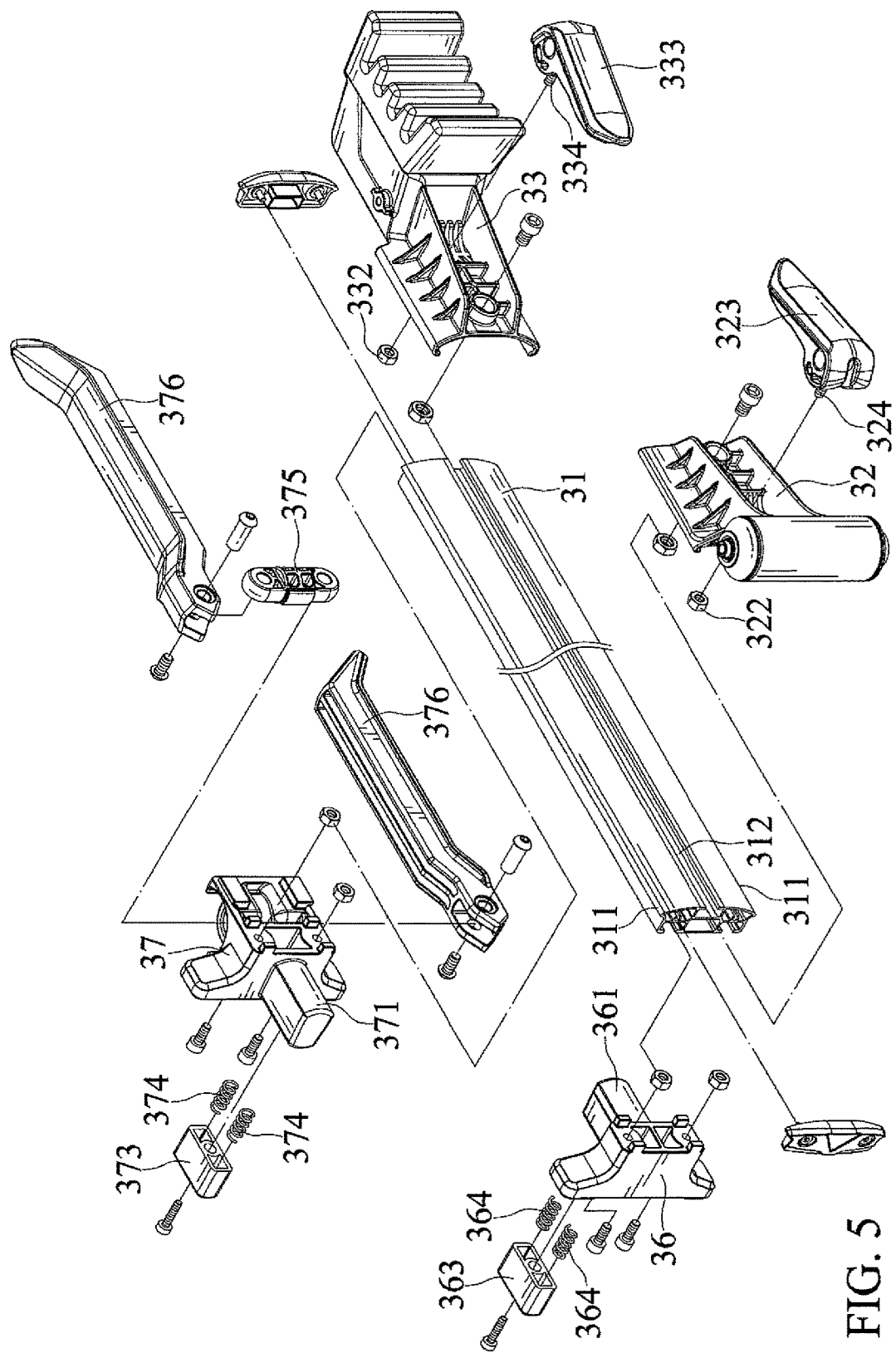
FIG. 5 is an exploded perspective view of the retaining device.
Figure 6:
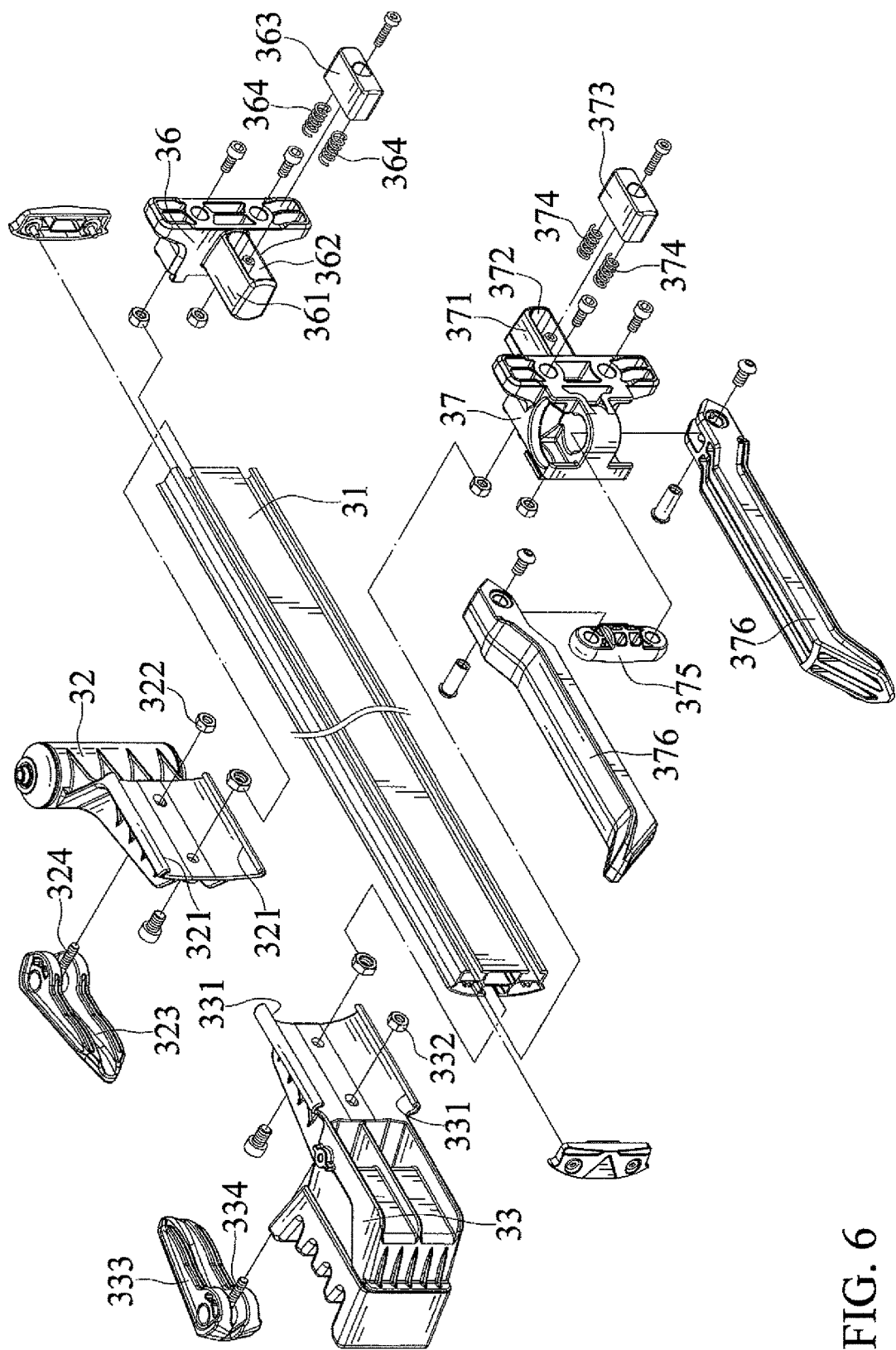
FIG. 6 is a view similar to FIG. 5, but taken from a different angle.
Figure 7:
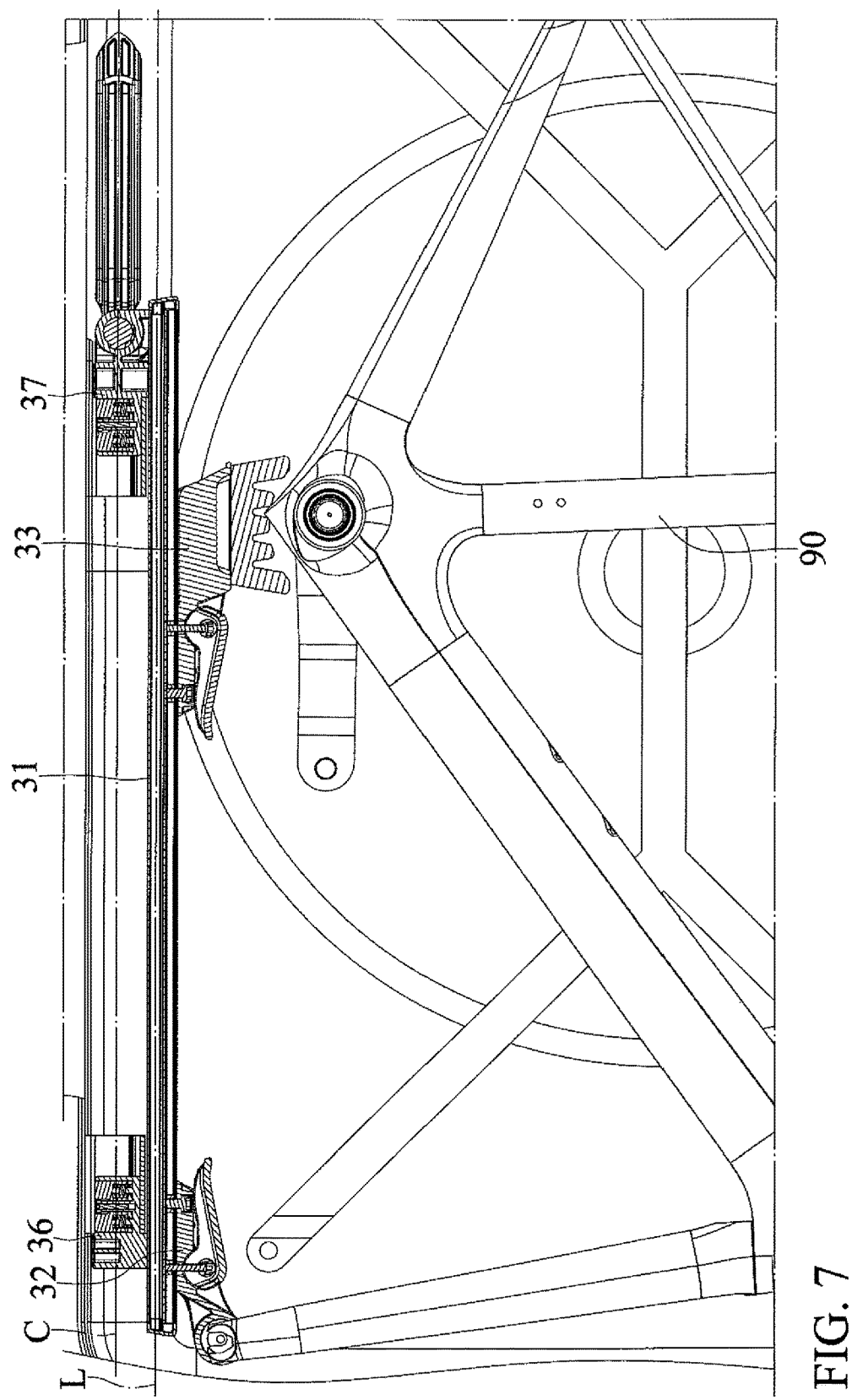
FIG. 7 is a cross-sectional view of the retaining device.
Figure 8:
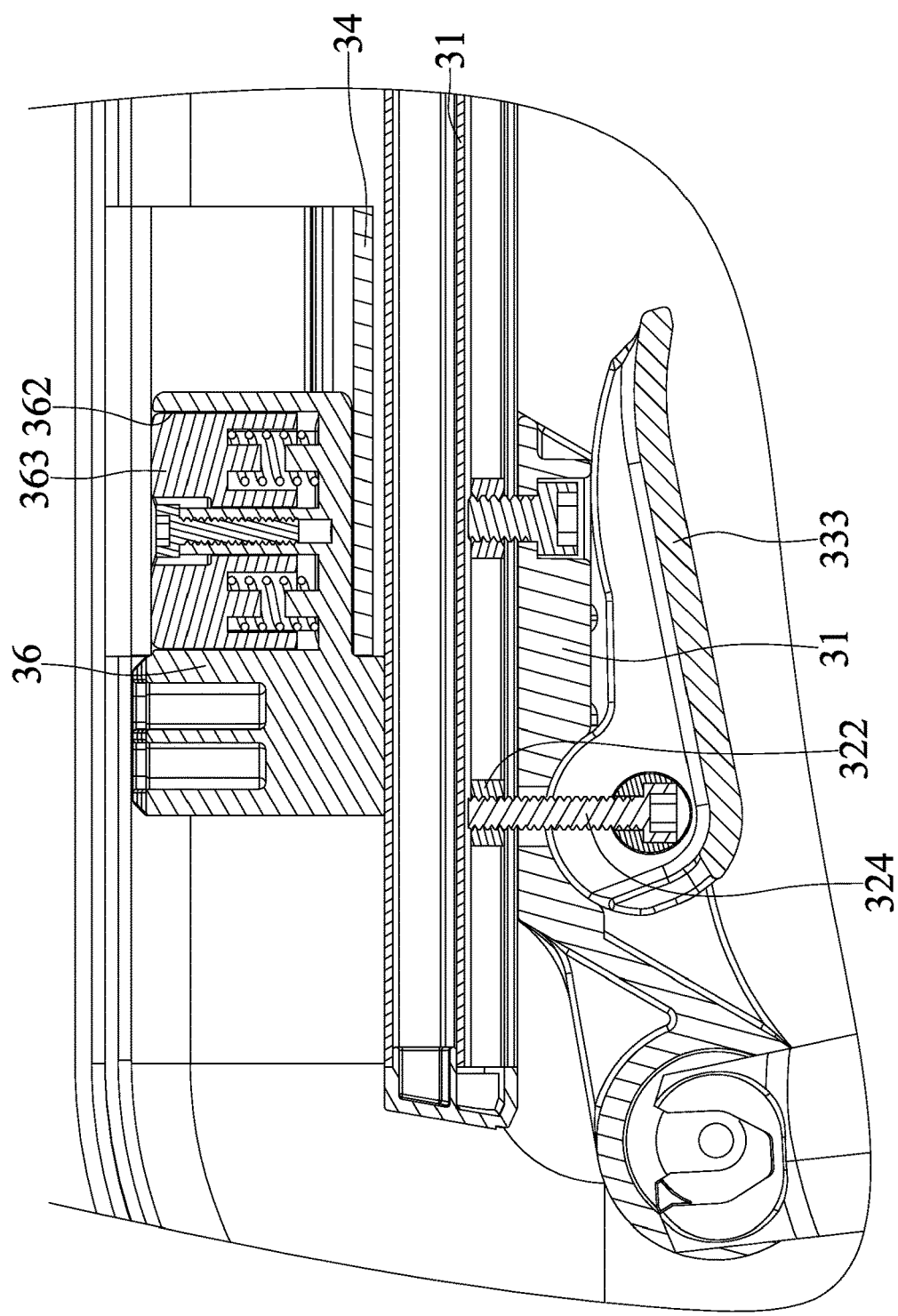
FIG. 8 is a partial cross-sectional view of FIG. 7.
Figure 9:
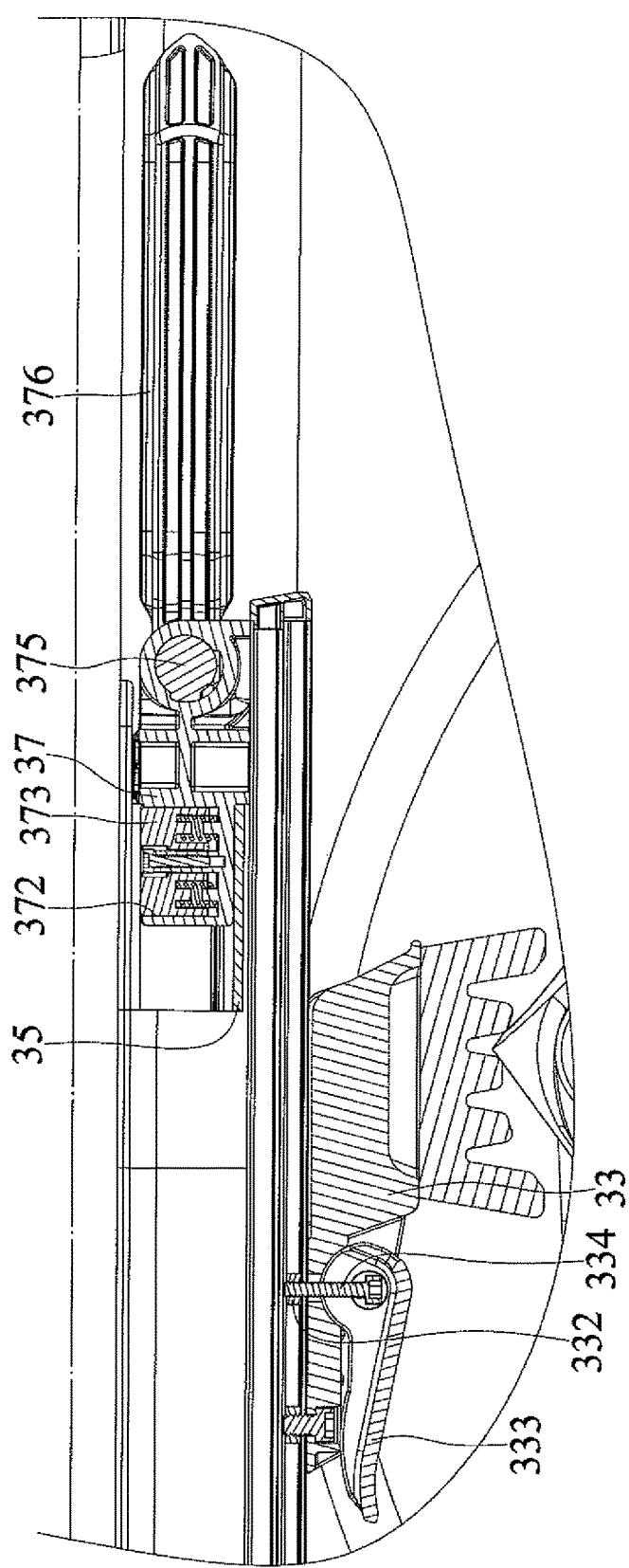
FIG. 9 is another partial cross-sectional view of FIG. 7.

A bicycle transport case 10 in accordance with the present invention includes a container 20 adapted to be opened and closed. The bicycle transport case 10 also includes a retaining device 30 configured to retain the bicycle frame 90 at various angular orientations.

The container 20 includes a first outer side 21 and a second outer side 22. The container 20 has a chamber for receiving a bicycle frame 90 defined by interior sides of the first and second outer sides 21 and 22. The first and second outer sides 21 and 22 have exterior sides including bumpers 211 and 221 mounted thereon and protruding above the exterior sides. When the container 20 is opened on the ground, the bumpers 211 and 221 prevent the first and second outer sides 21 and 22 from being damaged by the ground.

The retaining device 30 is pivotally and detachably connected to the container 20. The retaining device 30 includes a main guide rail 31 pivotally connected to the container 20 about an axis C. The main guide rail 31 extends axially along a longitudinal axis L. The longitudinal axis L is parallel to the axis C. The main guide rail 31 has a first side, a second side opposing the first side, and two lateral sides on opposite sides of the first and/or second sides. Moreover, the retaining device 30 includes at least one retaining stand for retaining the bicycle frame 90. In the preferred embodiment, there are two retaining stands 32 and 33. The two retaining stands 32 and 33 are movably mounted on the main guide rail 31 and adapted to be locked in various positions on the main guide rail 31. The retaining stand 32 retains the front fork of the bicycle frame 90, and the retaining stand 33 retains a bottom bracket of the bicycle frame 90 respectively to retain the bicycle frame 90 steadily. The two retaining stands 32 and 33 are positioned in a spaced relationship. The retaining stands 32 and 33 are movably connected to the first and lateral sides of the main guide rail 31 and are movably retained in two first and one second retaining channels 311 and 312. The retaining stands 32 and 33 include two engaging edges 321 and 331 retained in the two first and one second retaining channels 311 and 312 respectively. The retaining stands 32 and 33 respectively include a male connecting member connected thereto and a female connecting member positioned within the second retaining channel 312 and engaged with the male connecting member. The two first retaining channels 311 are respectively located on the two lateral sides of the main guide rail 31. The second retaining channel 312 is located on the first side of the main guide rail 31. Furthermore, the retaining stands 32 and 33 respectively include a quick release clamp engaged with the main guide rail 31. The quick release clamps are selectively operable to a locked position in which the retaining stands 32 and 33 are locked in a fixed position with respect to the main guide rail 31 and an unlocked position in which the retaining stands 32 and 33 are not locked in a fixed position with respect to the main guide rail 31. The quick release clamps of the retaining stands 32 and 33 respectively include a lever 323 and 333 having cams, a rod 324 and 334, and a nut 322 and 332. The rod 324 couples the cam of the lever 323 to the retaining stand 32 and is engaged with the nut 322 that is positioned within the second retaining channel 312. The rod 334 couples the cam of the lever 333 to the retaining stand 33 and is engaged with the nut 332 that is positioned within the second retaining channel 312.

At least one seat couples the retaining device 30 to the container 20. In the preferred embodiment, there are two seats 34 and 35. The two seats 34 and 35 couple the retaining device 30 to the container 20. The two seats 34 and 35 are fixedly connected to the container 20. The retaining device 30 includes two joint mechanisms 36 and 37 pivotally and detachably connected to the two seats 34 and 35 respectively. The two seats 34 and 35 respectively define cavities 341 and 351, and the joint mechanisms 36 and 37 are pivotally engaged in the cavities 341 and 351. The joint mechanisms 36 and 37 are connected to the second side of the main guide rail 31. The joint mechanisms 36 and 37 respectively include first connecting structures 361 and 371 that have one end connected to the main guide rail 31 and another end pivotally engaged in the respective cavity 341 and 351, a second connecting structure 363 and 373 pivotally engaged in the respective cavity 341 and 351 and biasingly engaged with the respective first connecting structure 361 and 371, and at least one biasing member 364 and 374 positioned between the respective first and second connecting structures 361, 371, 363, and 373. The first connecting structures 361 and 371 respectively form a recess 362 and 372 in which the respective biasing member 364 and 374 is inserted. Thus, the first connecting structures 361 and 371 and the second connecting structures 363 and 373 engaged therewith respectively enclose a space that holds the biasing members 364 and 374 respectively. The joint mechanisms 36 and 37 are pivotal to a fixed position in which the retaining stand 32 and 33 retains the bicycle frame 90 in an upright position. The two seats 34 and 35 respectively define a slot 342 and 352 extending from the cavity 341 and 351 and the first connecting structures 361 and 371 protrude into the slots 342 and 352 when the joint mechanisms 36 and 37 are pivoted to the fixed position. The slots 342 and 352 respectively have opposite sides and a width between the opposite sides. The cavities 341 and 351 respectively have a minimum width and a maximum width. The widths of the slots 342 and 352 are smaller than the minimum widths of the cavities 341 and 351.

Figure 10:
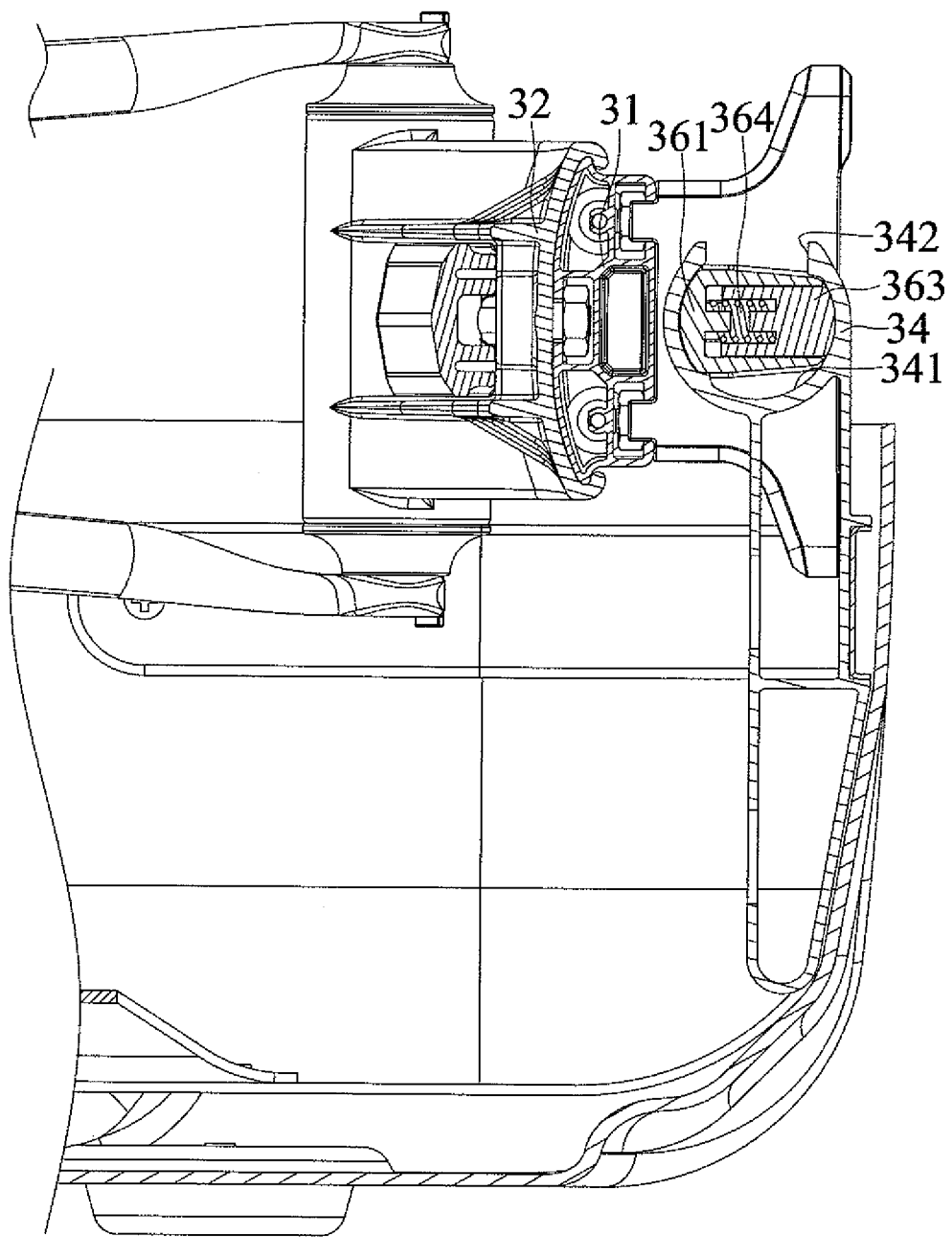
FIG. 10 is yet another partial cross-sectional view of FIG. 7.
Figure 11:
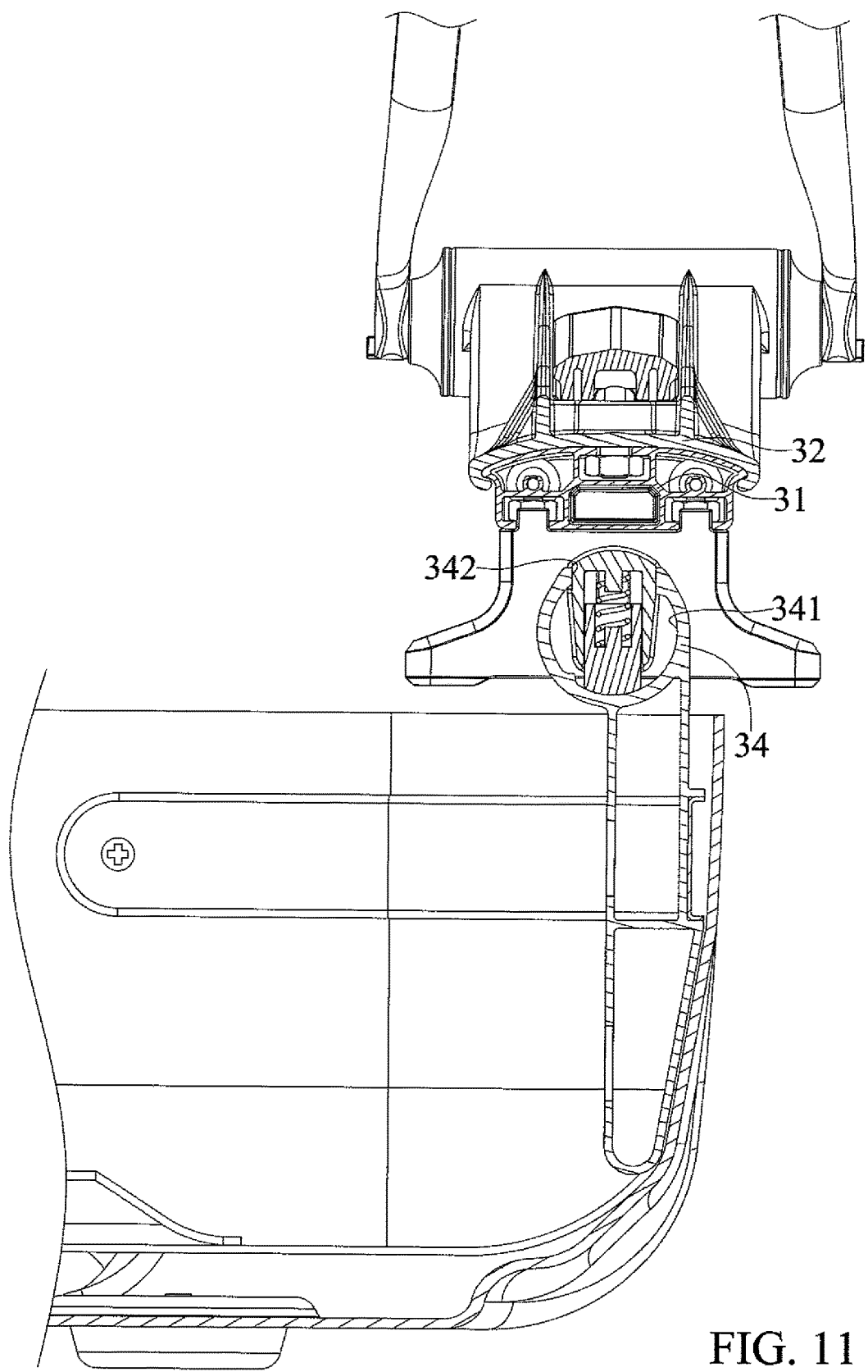
FIG. 11 is similar to FIG. 10, but shows the retaining device retaining the bicycle frame in a second orientation, with the bicycle frame in an upright position.
Figure 12:
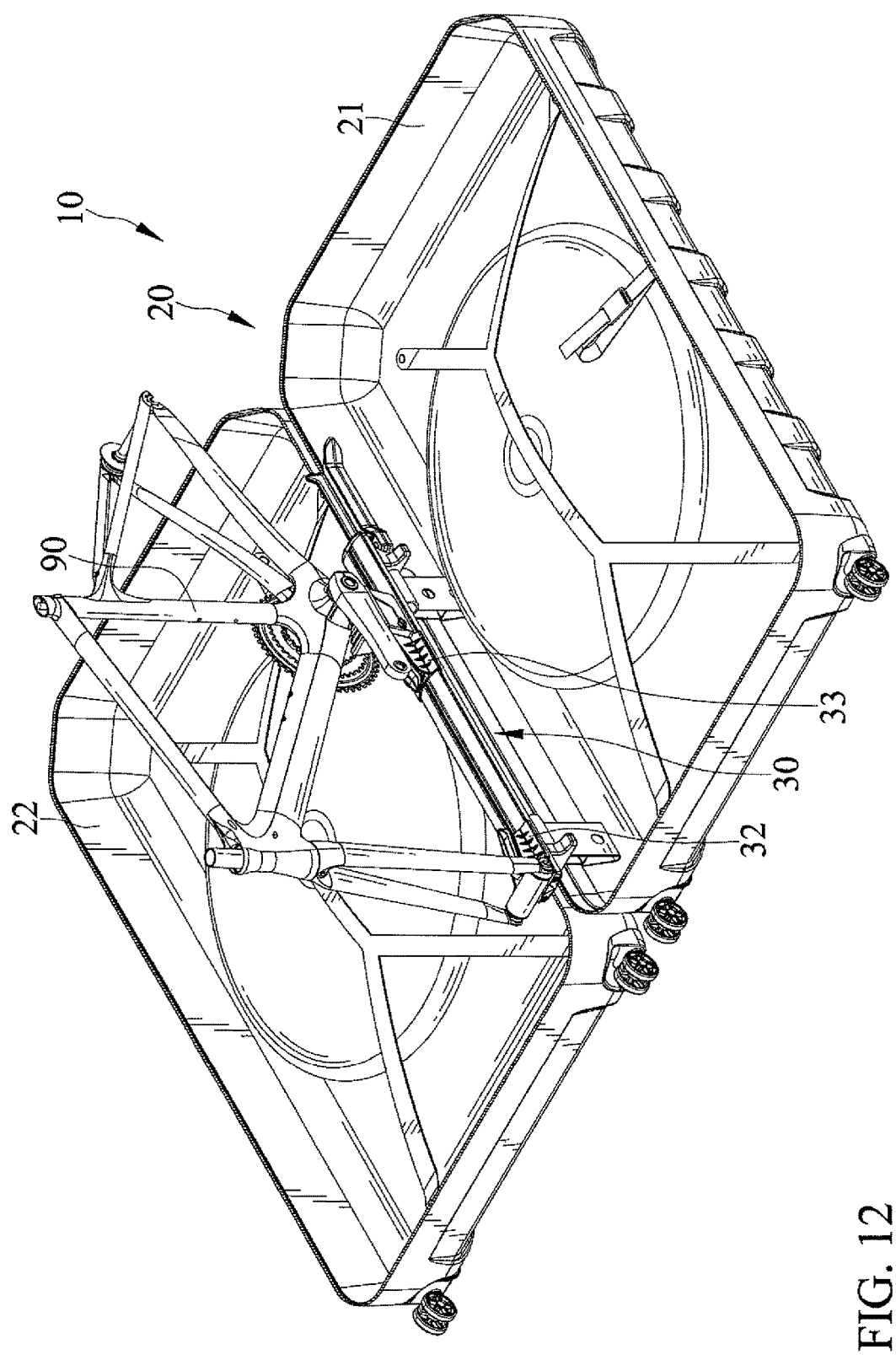
FIG. 12 is a perspective view showing the bicycle transport case in the open position and retaining the bicycle frame in the second orientation.
Figure 13:
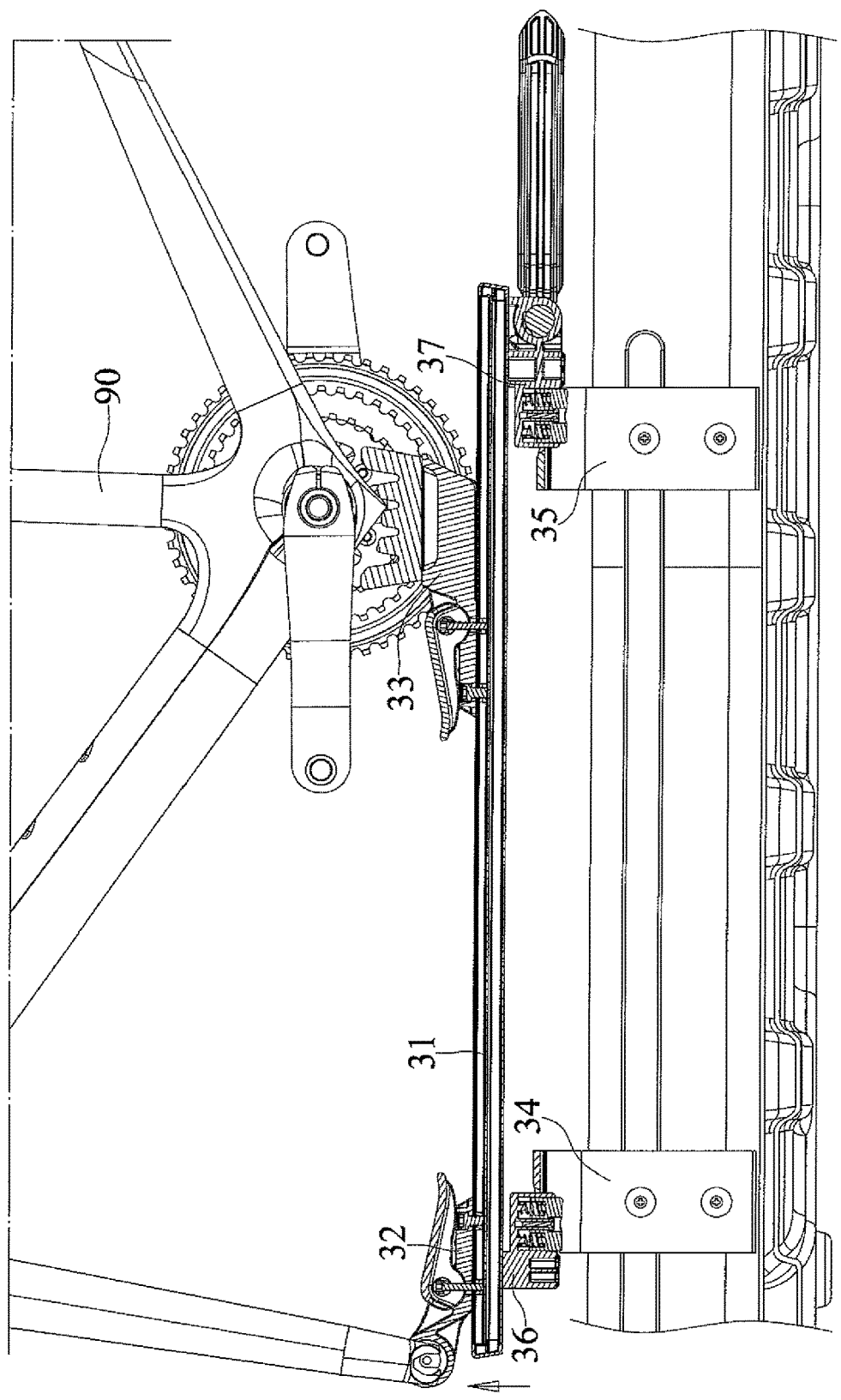
FIG. 13 is a cross-sectional view illustrating the retaining device and a container of the bicycle transport case adapted to disconnect from each other.

FIG. 10 shows that the first connecting structures 361 and 371 are disposed outside of the slots 342 and 352 when the two retaining stands 32 and 33 retain the bicycle frame 90 in a first orientation. FIGS. 10 and 11 show that the joint mechanisms 36 and 37 can pivot from a position in which the retaining stands 32 and 33 retain the bicycle frame 90 in a first orientation to a position in which the retaining stands 32 and 33 retain the bicycle frame 90 in a second orientation, i.e., the upright position, when the first connecting structures 361 and 371 are disposed outside of the slots 342 and 352. FIG. 11 shows that the first connecting structures 361 and 371 of the joint mechanisms 36 and 37 protrude into the slots 342 and 352 respectively and that the joint mechanisms 36 and 37 can maintain an orientation in which the retaining stands 32 and 33 retain the bicycle frame 90 in an upright position.

Figure 14:
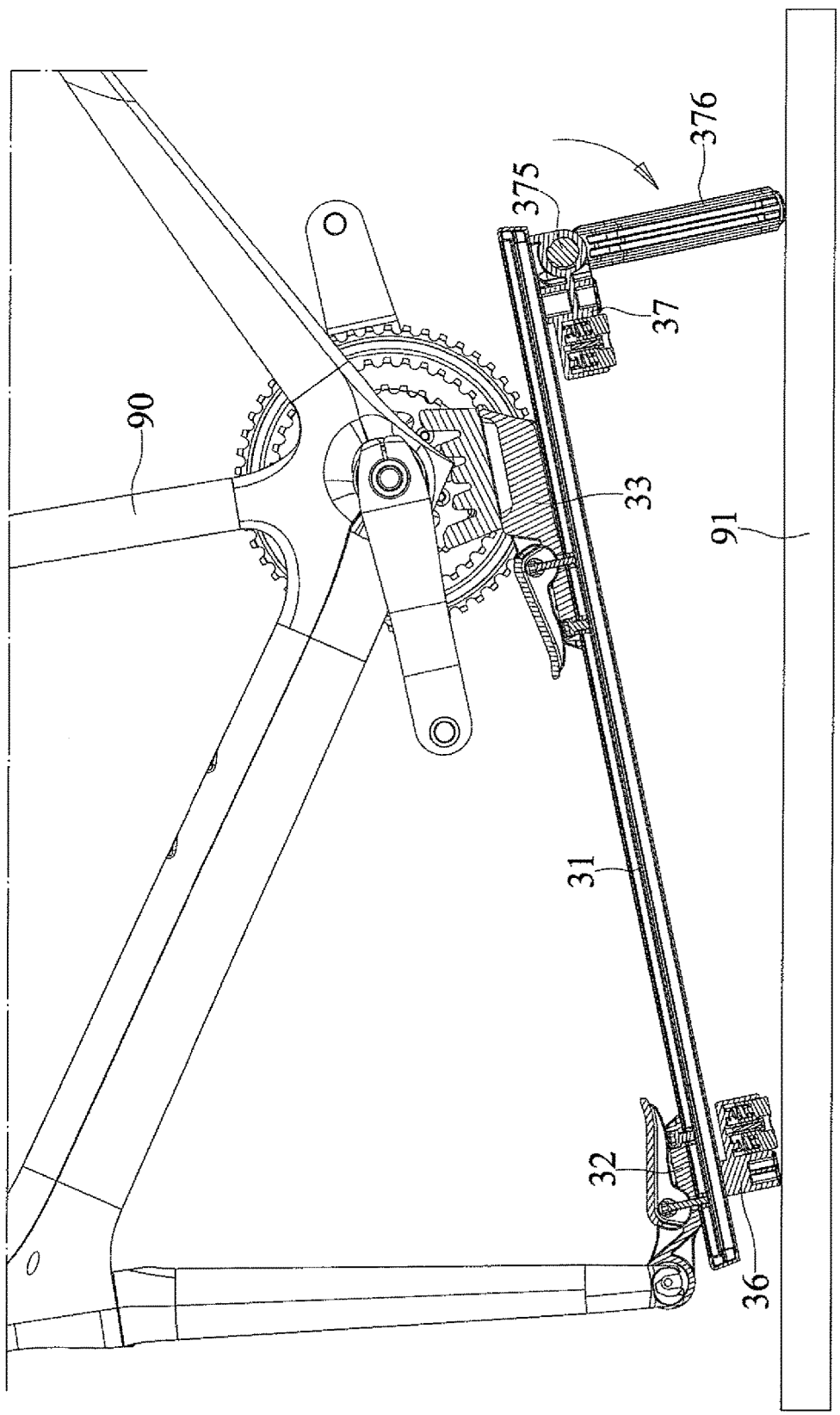
FIG. 14 is a cross-sectional view showing the retaining device in an erected position on a platform and retaining the bicycle frame.
Figure 15:
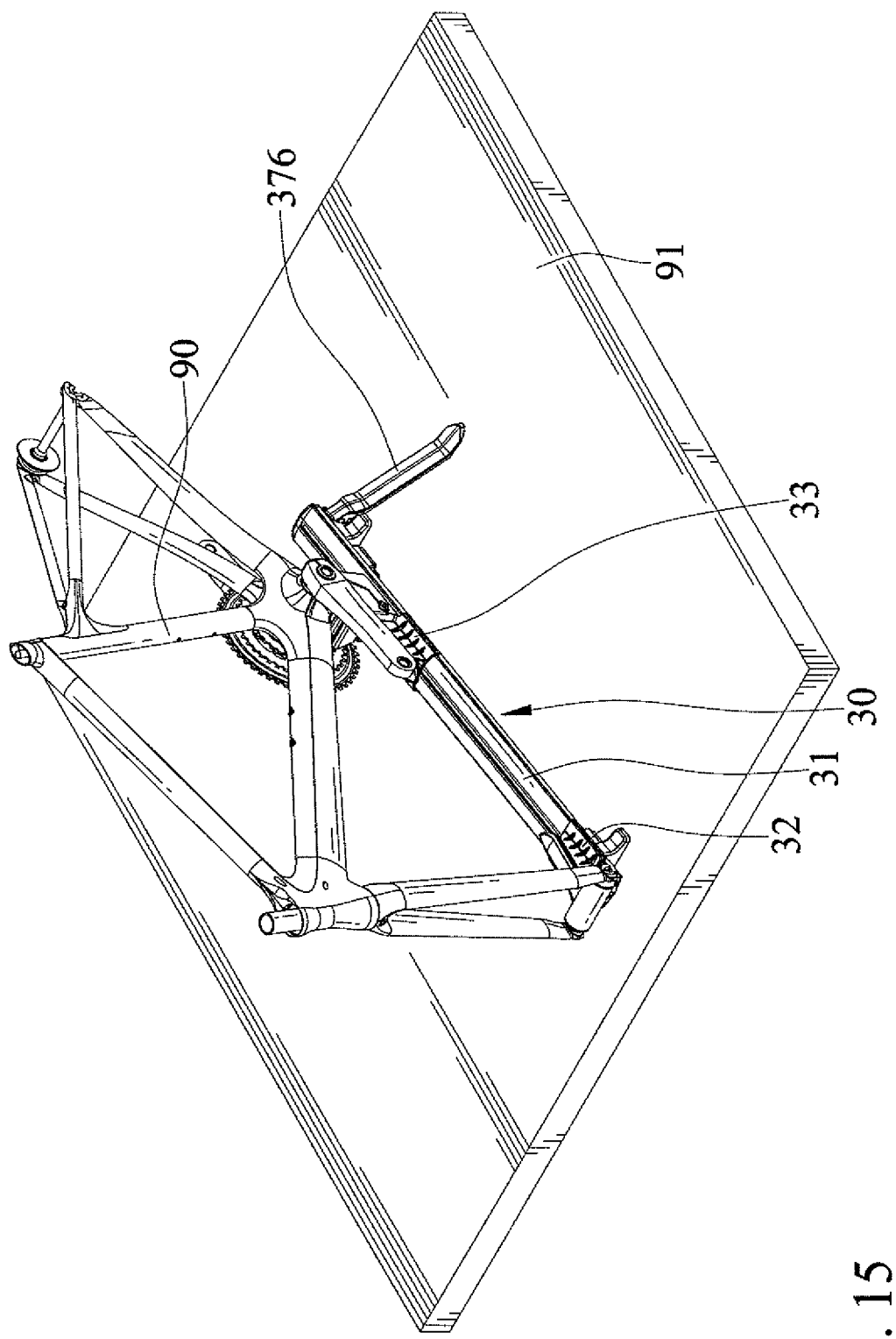
FIG. 15 is a perspective view showing the retaining device in an erected position on a platform and retaining the bicycle frame.

The retaining device 30 includes at least one support leg 376 pivotally connected to the one of the joint mechanisms 36 and 37 and being pivotal to a collapsed position extending parallel to the main guide rail 31 and an erected position extending transversely to the main guide rail 31. The at least one support leg 376 is pivotally connected to joint mechanism 37. The main guide rail 31 is disposed horizontally when the at least one support leg 376 is in the collapsed position. The main guide rail 31 is disposed obliquely when the at least one support leg 376 is in the erected position. As shown in FIGS. 14 and 15, the retaining device 30 is detached from the container 20 and is placed on a platform surface 91. The retaining stand 32 retains the front fork of the bicycle frame 90, and the retaining stand 33 retains a bottom bracket of the bicycle frame 90 respectively. The at least one support leg 376 is in the erected position. In the preferred embodiment, there are two support legs 376. The two support legs 376 are pivotally connected to a hinge 375 via two pivots and are pivotal away from each other and to a position that one support leg 376 is parallel to the other support leg 376. The hinge 375 has one end connected to the joint mechanism 37 and another end connected to the two support legs 376.

In view of the foregoing, the bicycle frame 90 can be retained steadily at various angular orientations by the retaining device 30. The retaining device 30 can detach from the container 20 and can stand steadily on the platform surface 91.

The foregoing is merely illustrative of the principles of this invention, and various modifications can be made by those skilled in the art without departing from the scope and spirit of the invention.

What is claimed is:

1. A bicycle transport case comprising:
   a container adapted to be opened and closed including a first outer side and a second outer side and having a chamber for receiving a bicycle frame defined by interior sides of the first and second outer sides; and
   a retaining device configured to retain the bicycle frame at various angular orientations pivotally and detachably connected to the container, wherein the retaining device includes a main guide rail pivotally connected to the container about an axis, at least one retaining stand for retaining the bicycle frame movably mounted on the main guide rail and adapted to be locked in various positions on the main guide rail, at least one joint mechanism connected to the main guide rail, and at least one support leg pivotally connected to the at least one joint mechanism, wherein the at least one support leg is pivotal to a collapsed position extending parallel to the main guide rail and an erected position extending transversely to the main guide rail, wherein the main guide rail is disposed horizontally when the at least one support leg is in the collapsed position, and wherein the main guide rail is disposed obliquely when the at least one support leg is in the erected position.

2. The bicycle transport case as claimed in claim 1, further comprising at least one seat coupling the retaining device to the container, wherein the at least one joint mechanism is pivotally and detachably connected to the at least one seat, and wherein the at least one seat defines a cavity and the at least one joint mechanism is pivotally engaged in the cavity.

3. The bicycle transport case as claimed in claim 1, wherein the at least one support leg includes two support legs pivotally connected to a hinge via two pivots and being pivotal away from each other and to a position that one support leg is parallel to another support leg, and wherein the hinge has one end connected to the at least one joint mechanism and another end connected to the two support legs.

4. The bicycle transport case as claimed in claim 1, wherein the at least one retaining stand includes a quick release clamp engaged with the main guide rail, and wherein the quick release clamp is selectively operable to a locked position in which the at least one retaining stand is locked in a fixed position with respect to the main guide rail and an unlocked position in which the at least one retaining stand is not locked in a fixed position with respect to the main guide rail.

5. The bicycle transport case as claimed in claim 4, wherein the quick release clamp includes a lever which has a cam, a rod, and a nut, wherein the rod couples the cam of the lever to the at least one retaining stand and is engaged with the nut, and wherein the nut is positioned within a retaining channel.

6. The bicycle transport case as claimed in claim 1, wherein each of the first and second outer sides of the container has an exterior side including a bumper mounted thereon and protruding above the exterior side.

7. The bicycle transport case as claimed in claim 1, wherein the at least one retaining stand includes two retaining stands movably mounted on the main guide rail and adapted to be locked in various positions on the main guide rail, and wherein the two retaining stands are positioned in a spaced relationship.

8. The bicycle transport case as claimed in claim 7, further comprising two seats coupling the retaining device to the container, wherein the two seats are fixedly connected to the container and positioned in a spaced relationship, wherein the at least one joint mechanism includes two joint mechanisms pivotally and detachably connected to the two seats respectively, and wherein the two seats respectively define two cavities and the two joint mechanisms are pivotally engaged in the two cavities of the two seats respectively.

9. A bicycle transport case comprising:
   a container adapted to be opened and closed including a first outer side and a second outer side and having a chamber for receiving a bicycle frame defined by interior sides of the first and second outer sides;
   a retaining device configured to retain the bicycle frame at various angular orientations pivotally and detachably connected to the container, wherein the retaining device includes a main guide rail pivotally connected to the container about an axis and at least one retaining stand for retaining the bicycle frame movably mounted on the main guide rail and adapted to be locked in various positions on the main guide rail; and
   at least one seat coupling the retaining device to the container, wherein the retaining device includes at least one joint mechanism pivotally and detachably connected to the at least one seat, wherein the at least one seat defines a cavity and the at least one joint mechanism is pivotally engaged in the cavity, wherein the at least one joint mechanism includes a first connecting structure having one end connected to the main guide rail and another end pivotally engaged in the cavity, a second connecting structure pivotally engaged in the cavity and biasingly engaged with the first connecting structure, and at least one biasing member positioned between the first and second connecting structures, wherein the at least one joint mechanism is pivotal to a fixed position in which the at least one retaining stand retains the bicycle frame in an upright position, and wherein the at least one seat defines a slot extending from the cavity and the first connecting structure protrudes into the slot when the at least one joint mechanism is pivoted to the fixed position.

10. The bicycle transport case as claimed in claim 9, wherein the retaining device includes at least one support leg pivotally connected to the at least one joint mechanism and being pivotal to a collapsed position extending parallel to the main guide rail and an erected position extending transversely to the main guide rail, wherein the main guide rail is disposed horizontally when the at least one support leg is in the collapsed position, and wherein the main guide rail is disposed obliquely when the at least one support leg is in the erected position.

11. A bicycle transport case comprising
   a container adapted to be opened and closed including a first outer side and a second outer side and having a chamber for receiving a bicycle frame defined by interior sides of the first and second outer sides;
   a retaining device configured to retain the bicycle frame at various angular orientations pivotally and detachably connected to the container, wherein the retaining device includes a main guide rail pivotally connected to the container about an axis and two retaining stands for retaining the bicycle frame movably mounted on the main guide rail and adapted to be locked in various positions on the main guide rail, and wherein the two retaining stands are positioned in a spaced relationship; two seats coupling the retaining device to the container, wherein the two seats are fixedly connected to the container and positioned in a spaced relationship, wherein the retaining device includes two joint mechanisms pivotally and detachably connected to the two seats respectively, wherein the two seats respectively define two cavities and the two joint mechanisms are pivotally engaged in the two cavities of the two seats respectively, wherein each of the two joint mechanisms includes a first connecting structure that has one end connected to the main guide rail and another end pivotally engaged in one of the two cavities, a second connecting structure pivotally engaged in the one of the two cavities and biasingly engaged with the first connecting structure, and at least one biasing member positioned between the first and second connecting structures, wherein the two joint mechanisms are pivotal to a fixed position in which the two retaining stands retain the bicycle frame in an upright position, and wherein the two seats respectively define two slots extending from the two cavities and the first connecting structures protrude into the two slots respectively when the two joint mechanisms are pivoted to a fixed position.

12. The bicycle transport case as claimed in claim 11, wherein the retaining device includes at least one support leg pivotally connected to the one of the two joint mechanisms and being pivotal to a collapsed position extending parallel to the main guide rail and an erected position extending transversely to the main guide rail, wherein the main guide rail is disposed horizontally when the at least one support leg is in the collapsed position, and wherein the main guide rail is disposed obliquely when the at least one support leg is in the erected position.

13. The bicycle transport case as claimed in claim 12, wherein the at least one support let includes two support legs pivotally connected to a hinge via two pivots and being pivotal away from each other and to a position that one support leg is parallel to another support leg, and wherein the hinge has one end connected to one of the two joint mechanisms and another end connected to the two support legs.

14. The bicycle transport case as claimed in claim 12, wherein each of the two retaining stands include a quick release clamp engaged with the main guide rail, wherein the quick release clamps of the two retaining stands are selectively operable to a locked position in which the two retaining stands are locked in a fixed position with respect to the main guide rail and an unlocked position in which the two retaining stands are not locked in a fixed position with respect to the main guide rail.

15. The bicycle transport case as claimed in claim 14, wherein each of the quick release clamps of the two retaining stands includes a lever which has a cam, a rod, and a nut, wherein the rods couple the cams of the levers of the quick release clamps to the two retaining stands respectively and are engaged with the nuts respectively, and wherein the nuts are positioned within retaining channels respectively.

16. The bicycle transport case as claimed in claim 12, wherein each of the first and second outer sides of the container respectively has an exterior side including a bumper mounted thereon and protruding above the exterior side.

17. The bicycle transport case as claimed in claim 11, wherein one of the two retaining stands is configured to retain a front fork of the bicycle frame and another retaining stand is configured to retain a bottom bracket of the bicycle frame respectively to retain the bicycle frame steadily.

* * * * *